Dec. 14, 1948.  L. W. HOGAN  2,456,416
POTATO DIGGING MACHINE
Filed April 7, 1945  3 Sheets-Sheet 1

Inventor
Louis W. Hogan,

By Clarence A. O'Brien
and Harvey B. Jacobson
Attorneys

Dec. 14, 1948.   L. W. HOGAN   2,456,416
POTATO DIGGING MACHINE
Filed April 7, 1945   3 Sheets-Sheet 2
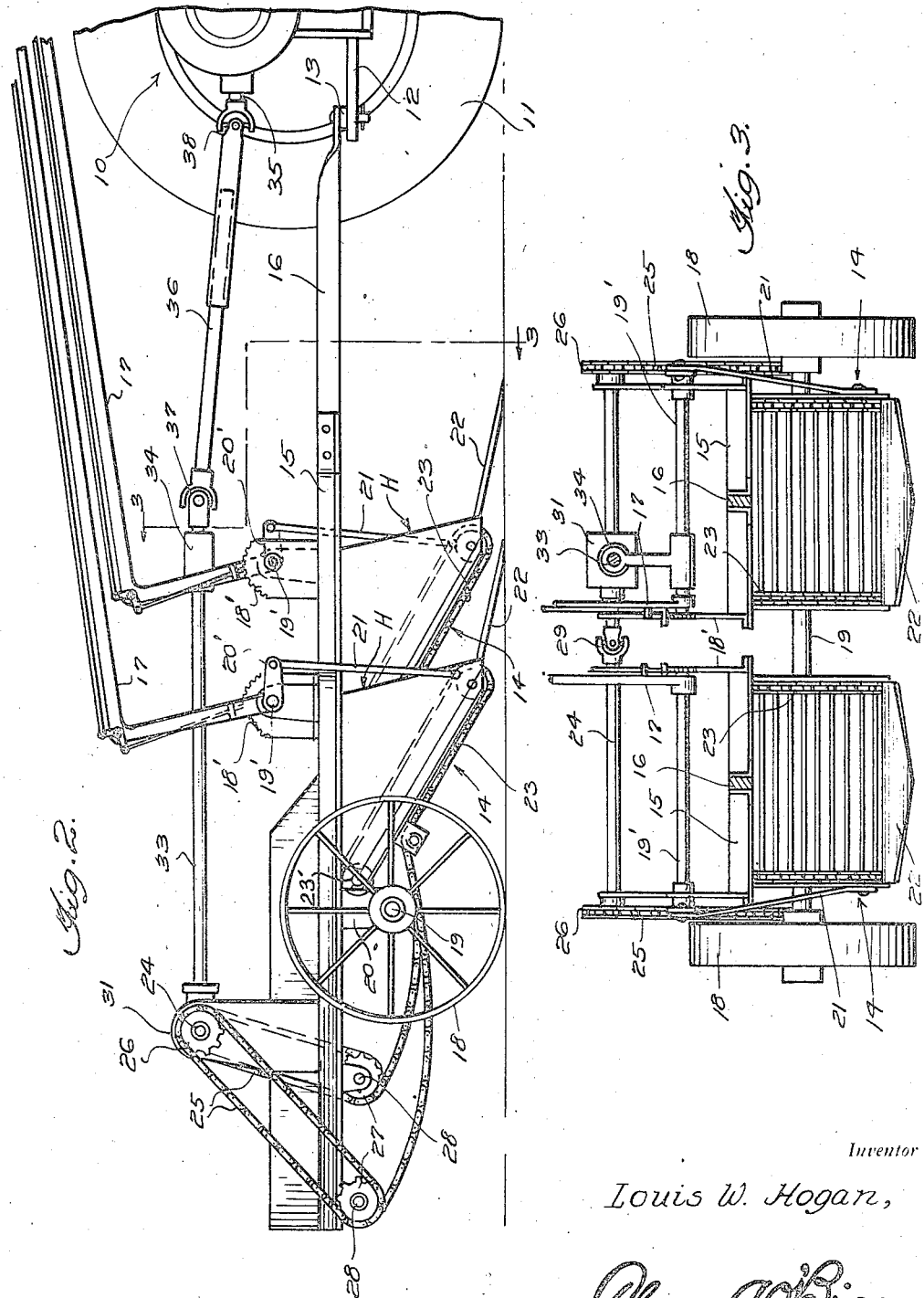
Inventor
Louis W. Hogan,
By Clarence A. O'Brien
and Harvey B. Jacobson
Attorneys Dec. 14, 1948.     L. W. HOGAN     2,456,416
POTATO DIGGING MACHINE
Filed April 7, 1945     3 Sheets-Sheet 3

Inventor
Louis W. Hogan,
By Clarence A. O'Brien
and Harvey B. Jacobson
Attorneys Patented Dec. 14, 1948

2,456,416

UNITED STATES PATENT OFFICE 2,456,416

POTATO DIGGING MACHINE

Louis W. Hogan, Houlton, Maine

Application April 7, 1945, Serial No. 587,083

2 Claims. (Cl. 55—51)

This invention relates to potato digging machines of the kind adapted to be drawn and driven by a tractor and embodying a pair of potato diggers arranged side by side to simultaneously dig two rows of crops.

Heretofore, potato digging machines of the above kind have been constructed with the potato diggers arranged in transverse alignment so that the digging implements of the diggers engage the ground at points aligned transversely of the machine. In order to simultaneously dig two rows of crops, the potato diggers are arranged comparatively close to each other, and considerable difficulty has been experienced in drawing the machine ahead due to clogging of plants in the space between the diggers, particularly when the plants have extremely heavy foliage above ground.

I have found that the above objection may be effectively overcome by constructing the machine with one digger arranged slightly in advance of the other so that the plants may readily yield laterally from the digging implement of one digger in advance of the other. In this way, less clogging of plants takes place between the diggers and less resistance is offered to the forward travel of the machine, so that the digging operation may be more thoroughly and expeditiously performed.

More specific objects and features of the invention will become apparent from the following description when considered in connection with the accompanying drawings, and the invention consists in the novel form, combination and arrangement of parts hereinafter more fully described shown in the drawings and claimed.

In the drawings, wherein like reference characters indicate corresponding parts throughout the several views:

Figure 2 is a side elevational view thereof.

Figure 3 is a vertical transverse section taken on line 3—3 of Figure 2.

Figure 1:
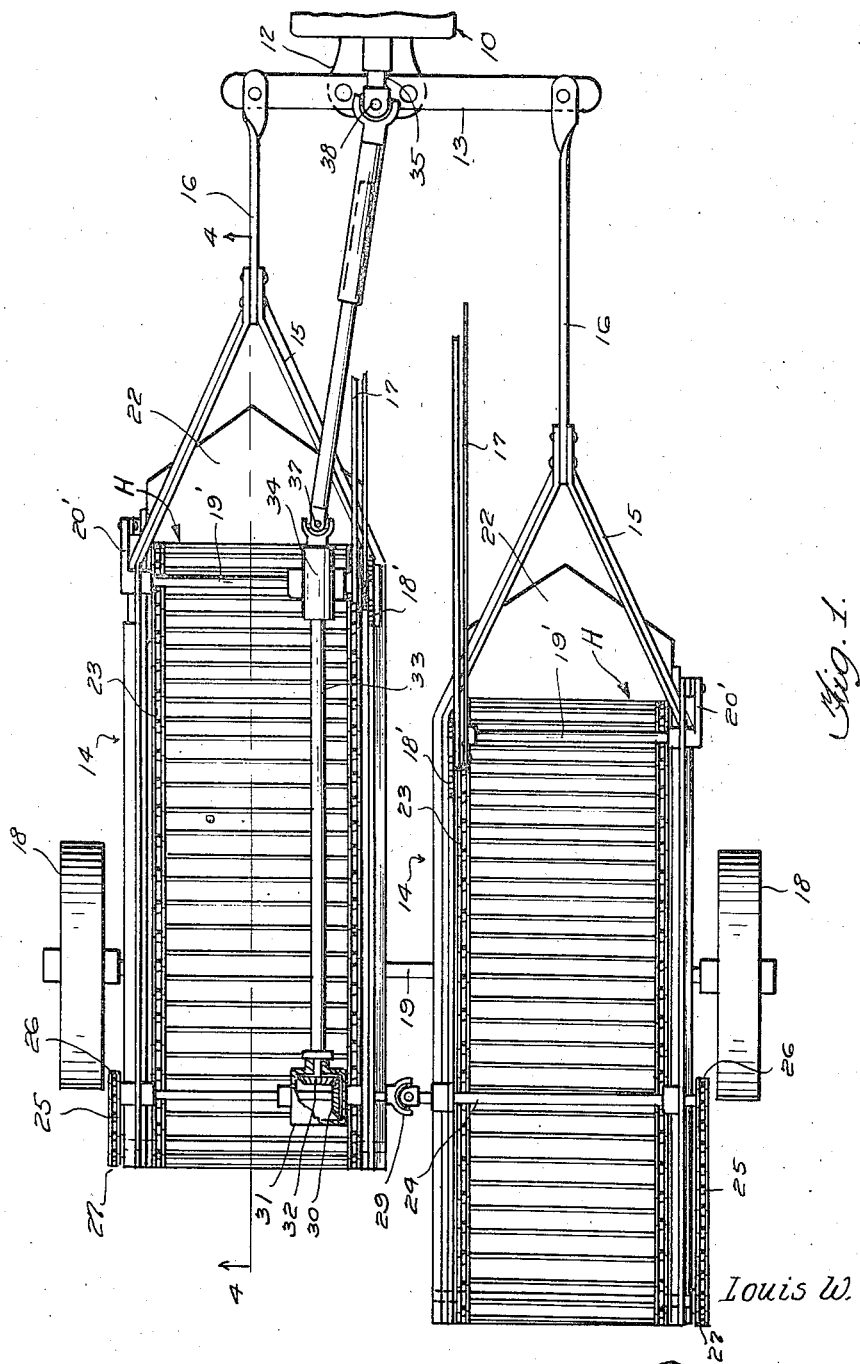
Figure 1 is a fragmentary top plan view of a potato digging machine embodying the present invention, and showing the machine connected to the rear part of a tractor.
Figure 4:
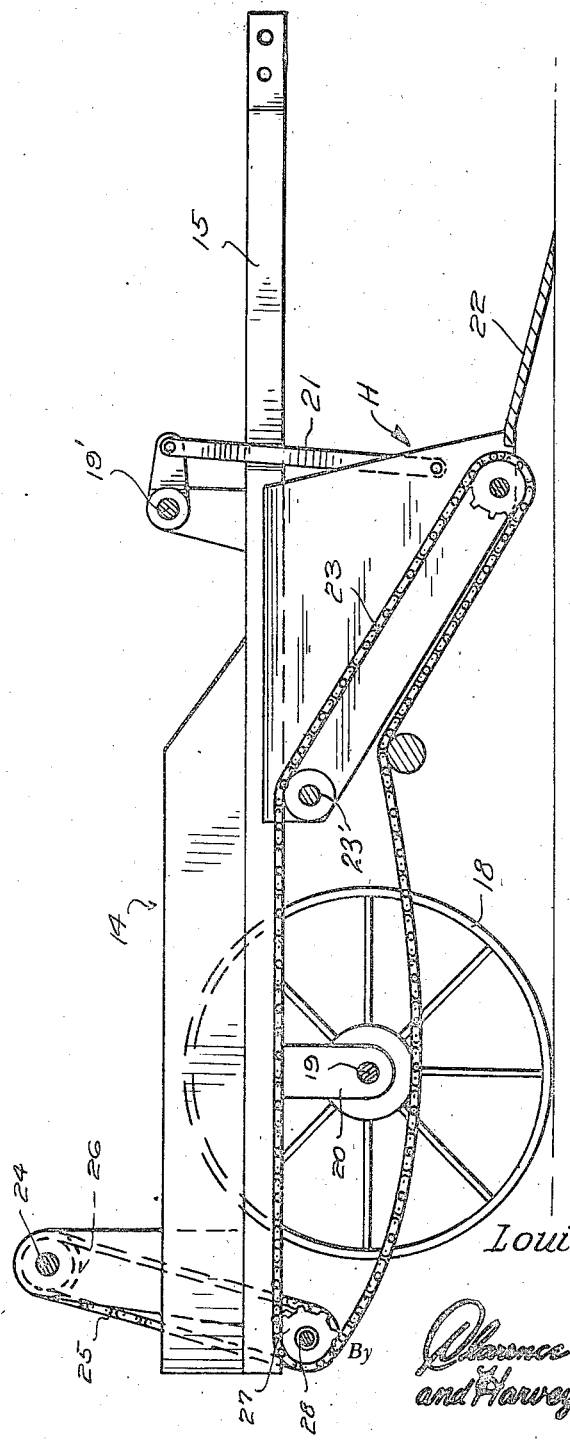
Figure 4 is a fragmentary longitudinal section taken on line 4—4 of Figure 1.

Referring in detail to the drawings, the reference character 10 designates a tractor having the usual rear traction wheels, one of which is shown at 11 in Figure 2. The double-row potato digging machine embodying the present invention is illustrated as connected to the coupling member 12 of the tractor by means of a cross bar 13.

The present machine embodies two potato diggers 14 which, to a considerable degree, are of conventional form and well known in the art. The two potato diggers are spaced apart a relatively short distance to simultaneously dig two rows of crops, and each digger is supported at its front end by being connected to the cross bar 13 by means of a bail 15 and a tongue 16. The arrangement is such as to permit the gathering heads H of the diggers to be swung vertically by properly manipulating the levers 17, so as to raise their forward ends above the ground and to depress them into position for digging the potatoes. The arrangement is also such that the forward ends of the potato diggers are supported by the tractor, and their rear ends are supported by wheels 18 rotatably mounted on the ends of a transverse axle 19 upon which the rear portions of the diggers are mounted, as at 20. The levers 17 are preferably of angular form so as to extend forwardly to points near the driver's seat of the tractor, and they are associated with rack segments 18' and their pivoted ends, and provided with suitable manually operable catches which coact with the rack segments to releasably lock the levers in any desired position of adjustment. The levers are shown as fixed on rock shafts 19' which have crank arms 20' connected to the forward ends of the gathering heads H by links 21. The arrangement permits independent raising or lowering of the forward ends of the gathering heads by manipulation of the levers 17. The gathering heads swing about the shafts 23' of the diggers.

As shown clearly in Figures 1 and 2, one potato digger is arranged slightly in advance of the other, although both are mounted upon the same axle 19. This arrangement is permitted by making one tongue 16 longer than the other, and the digging implement 22 of one digger thus operates completely in advance of the digging element of the other digger. In this way, the plants may readily yield laterally from the digging implement of the digger which is arranged in advance of the other. In practice, this has resulted in minimizing the clogging of foliage of the plants between the diggers so that the digging operation may be proceeded with more expeditiously and efficiently with a minimum resistance to forward travel of the machine. Thus, a very real and important objection to conventional machines has been effectively overcome in an advantageous and simple manner.

The conveyor chains 23 of the potato diggers are driven from an overhead shaft 24, mounted transversely of and above the rear portions of the potato diggers, by sprocket chains 25. Chains 25 are trained over sprocket wheels 26 secured on shaft 24, and over sprocket wheels 27 secured on the conveyor shafts 28 of the potato diggers. The shaft 24 is jointed at 29 between the potato diggers. Shaft 24 is driven from a power shaft of the tractor, and as shown, said shaft 24 has a bevel gear wheel 30 thereon which is contained in the housing 31 and meshes with a beveled pinion 32 which is secured on a shaft 33. Shaft 33 extends forwardly and has its forward end portion journaled in a bearing 34 upon the forward end of one of the diggers. The forward end of shaft 33 is connected to the power take-off shaft 35 of the tractor by means of a telescopic shaft 36 and universal connections 37 and 38.

In operation, the tractor is driven through the field so that the potato diggers are drawn through the hills and dig up the potatoes. The potatoes are lifted out of the ground by the digging implements 22 and delivered onto the conveyor chains which convey the potatoes rearwardly. As the potatoes are conveyed rearwardly by the conveyor chains, they are separated from the vines and discharged at the rear of the diggers. The conveyor chains of the potato diggers are driven from the power shaft of the tractor, and the front ends of the potato digger gathering heads may be raised or lowered independently at will by manipulation of the levers 17.

From the foregoing description, it is believed that the construction, operation and advantages of the invention will be readily understood and appreciated by those skilled in the art. Minor changes may be made in details of construction illustrated and described, such as fall within the spirit and scope of the invention as claimed.

What I claim is:

1. In a tractor-drawn and driven double-row potato digging machine, the combination with a tractor having a power shaft, of a pair of similar connected-together potato diggers each including a main frame supported near its rear end by wheels and each having a vertically adjustable pivoted gathering head at its forward end, each potato digger having a single endless conveyor chain mechanism, one digger being completely arranged in advanced relation to the other, a vertically rigid draft connection between said tractor and the main frame of each potato digger, and driving connections between the power shaft of the tractor and the conveyor chain mechanisms of the two potato diggers including an overhead universally jointed transverse shaft mounted upon and extending across and above the rear portions of the potato diggers, gearing connections between said shaft and the conveyor chain mechanisms of the diggers, and universally jointed telescopic shaft connections between said transverse shaft and said power shaft, and means including angular levers mounted on said diggers and extending forwardly within reach of the driver's seat of the tractor for adjustably raising and lowering said gathering heads.

2. In a tractor-drawn and driven double-row potato digging machine, the combination of a pair of similar potato diggers arranged in spaced side-by-side relation and each having a single endless conveyor chain, said diggers having pivoted gathering heads which may be independently raised or lowered, wheel-supporting elements supporting the rear ends of the diggers, a conveyor chain driving means including a universally jointed transverse drive shaft extending from one digger to the other and across and transverse above the rear ends of the latter and drive connections between said transverse shaft and the conveyor chains of both diggers, drive connections between said shaft and a power shaft of the tractor, vertically rigid draft connections between said diggers and the tractor, one digger being completely arranged in advanced relation to the other, and means including angular levers mounted on said diggers and extending forwardly within reach of the driver's seat of the tractor for adjustably raising and lowering said gathering heads.

LOUIS W. HOGAN.

REFERENCES CITED

The following references are of record in the file of this patent:

UNITED STATES PATENTS

| Number | Name | Date |
|---|---|---|
| 1,650,991 | Knoerzer | Nov. 29, 1927 |
| 1,721,122 | Johnson | July 16, 1929 |
| 1,810,889 | Spire | June 16, 1931 |
| 1,836,172 | Johnson | Dec. 15, 1931 |
| 1,872,744 | Johnson | Aug. 23, 1932 |
| 1,988,254 | Smith | Jan. 15, 1935 |
| 2,030,587 | Heaslet | Feb. 11, 1936 |
| 2,172,435 | Cook | Sept. 12, 1939 |
| 2,221,765 | Graham et al. | Nov. 19, 1940 |
| 2,417,580 | Young | Mar. 18, 1947 |